Figure 1:
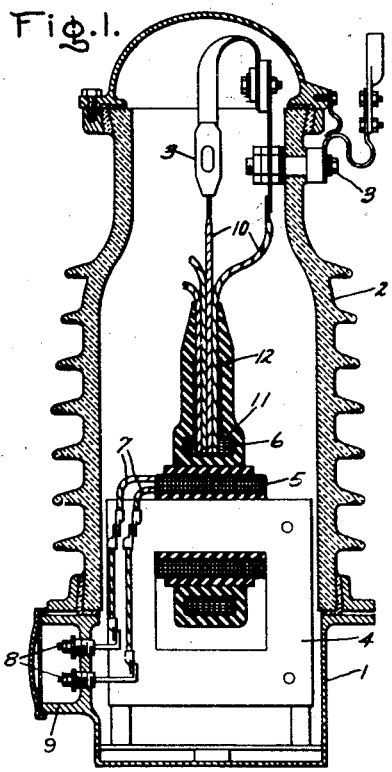

Feb. 17, 1948. W. J. BILODEAU 2,436,188
ELECTRIC WINDING
Filed Oct. 12, 1945 3 Sheets-Sheet 1

Inventor:
Wilfred J. Bilodeau,
by Ernest C. Britton
His Attorney.

Feb. 17, 1948. W. J. BILODEAU 2,436,188
ELECTRIC WINDING
Filed Oct. 12, 1945 3 Sheets-Sheet 2
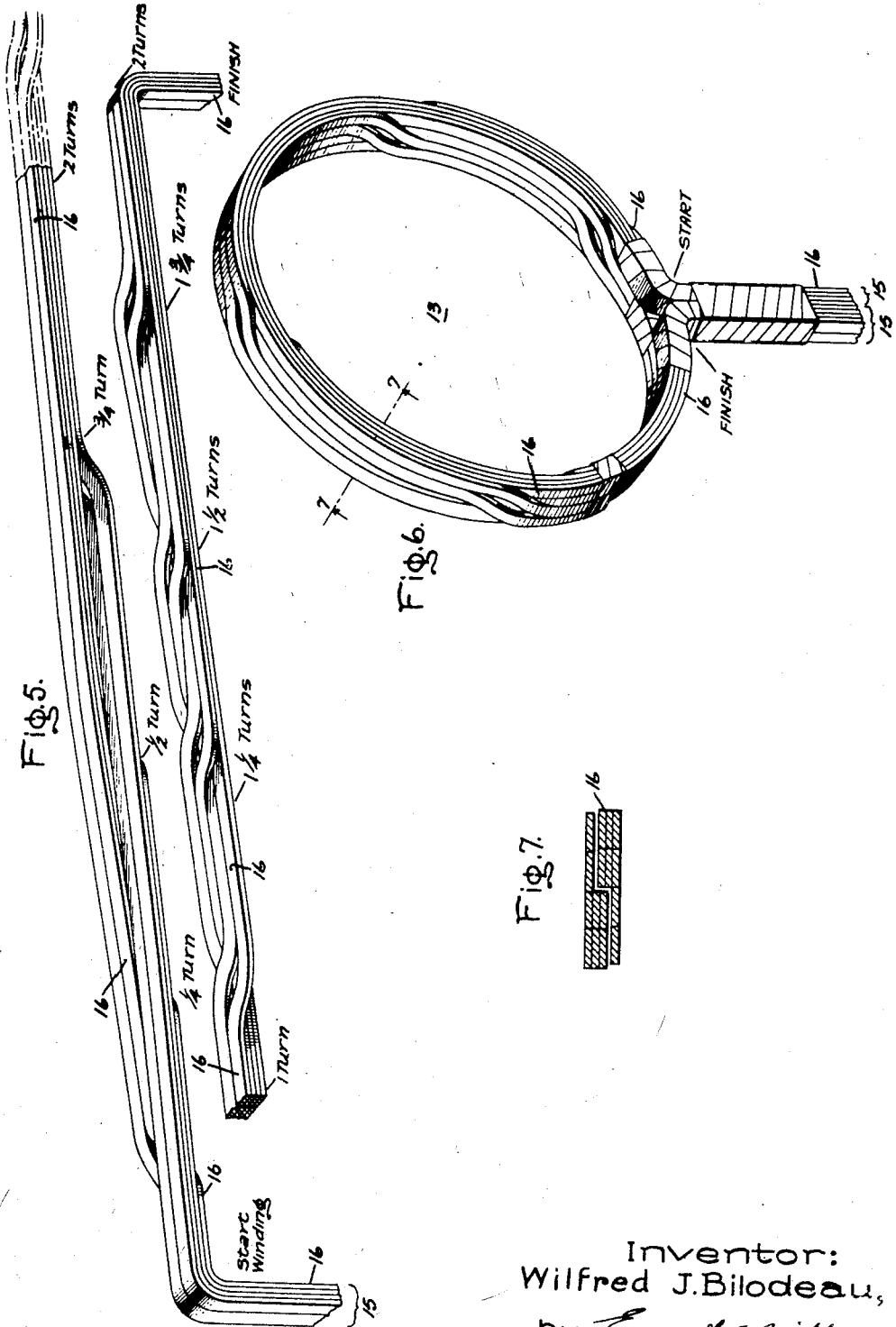
Inventor:
Wilfred J. Bilodeau,
by Ernest C. Britton
His Attorney.

Feb. 17, 1948.                W. J. BILODEAU                         2,436,188
                                ELECTRIC WINDING
                              Filed Oct. 12, 1945                3 Sheets—Sheet 3
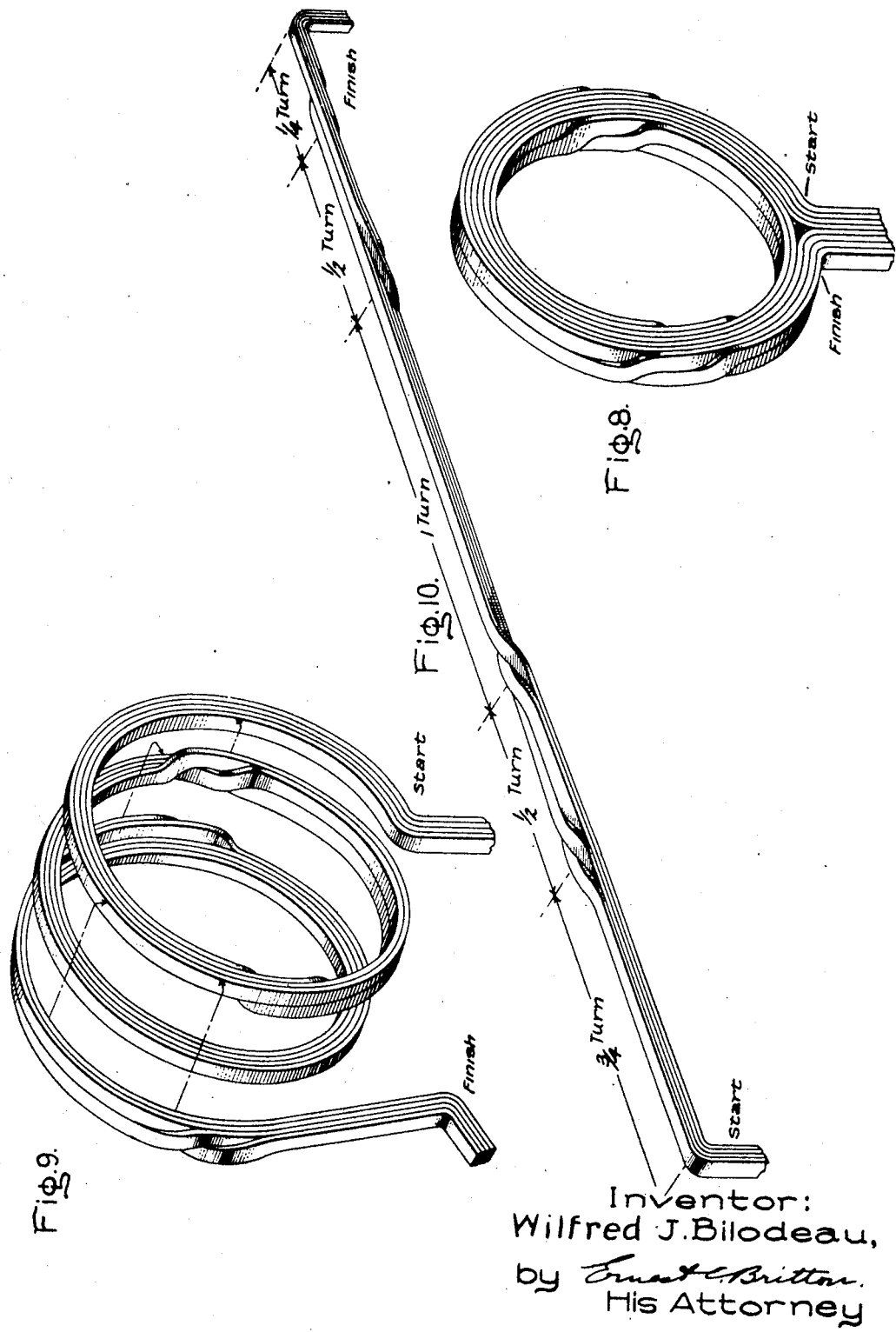
Inventor:
Wilfred J. Bilodeau,
by Ernest C. Britton.
His Attorney Patented Feb. 17, 1948

2,436,188

UNITED STATES PATENT OFFICE 2,436,188

ELECTRIC WINDING

Wilfred J. Bilodeau, Windsor, Mass., assignor to General Electric Company, a corporation of New York Application October 12, 1945, Serial No. 621,915

3 Claims. (Cl. 175—362)

1

This invention relates to electric windings and more particularly to improvements in the primary winding of a high voltage current transformer.

The primary winding of a current transformer for a high voltage alternating-current circuit is connected in series with one of the circuit conductors and it has insulation which is at least sufficient to withstand the voltage to ground of the conductor. The voltage difference between the terminals of the winding is, however, very small and, therefore, the usual practice is to locate the primary winding a substantial distance from its terminals and to connect the winding to its terminals through leads which are close together and run parallel to each other. The leads can be close together because they have a small voltage difference, while they are made long so that there can be sufficient insulation between the terminals and the casing or support for the primary winding and the rest of the transformer including its core and secondary winding.

It is standard practice to surround the leads and also the primary winding with a conductive shield which is inside the main insulation and which serves to grade or properly distribute the voltage stress in the insulation. In ordinary primary windings for high voltage transformers there is a substantial spacing between the start and finish of the winding so that it is necessary to bend the leads across the winding so as to bring them together and inside of the electrostatic shield. In the larger size transformers the conductor is made of a heavy bar, or bars, of copper so that the conductor cannot be bent at a very sharp angle or on a small radius of curvature with the result that the construction becomes bulky and awkward at the start and finish of the winding.

In accordance with this invention there is provided a novel winding which is characterized by transpositions of the strands forming the conductor of the winding in such a way that the start and finish of the winding come together at the same place and with minimum separation, thus reducing the size of the electrostatic shield and also minimizing sharp ends or corners which, as is well known, are points of high voltage stress.

An object of the invention is to provide a new and improved electric winding.

Another object of the invention is to provide an improved primary winding construction for high voltage current transformers.

A further object of the invention is to provide an improved electric induction apparatus.

The invention will be better understood from the following description taken in connection with the accompanying drawing and its scope will be pointed out in the appended claims.

In the drawing Fig. 1 is a vertical semi-section

Figure 4:
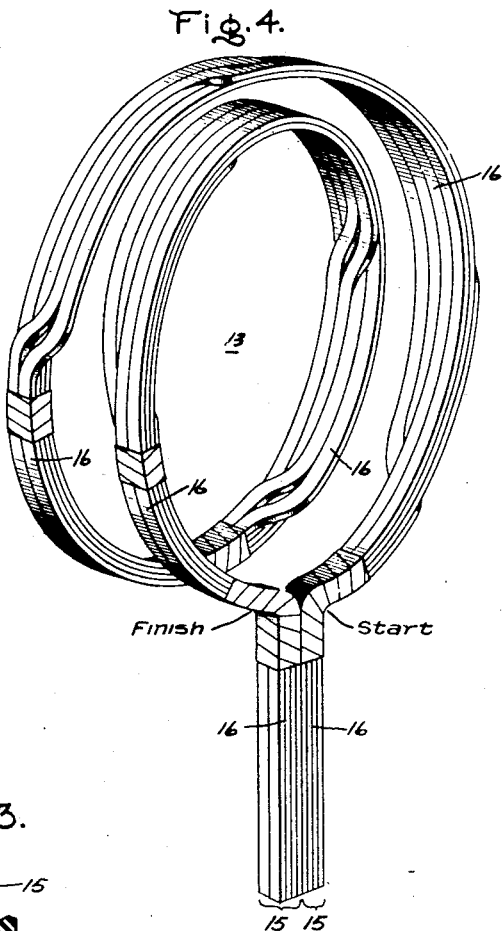
Figure 2:
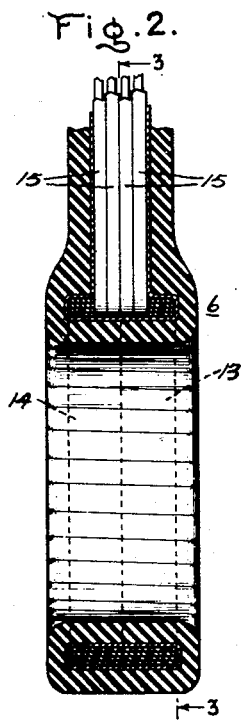
Figure 3:
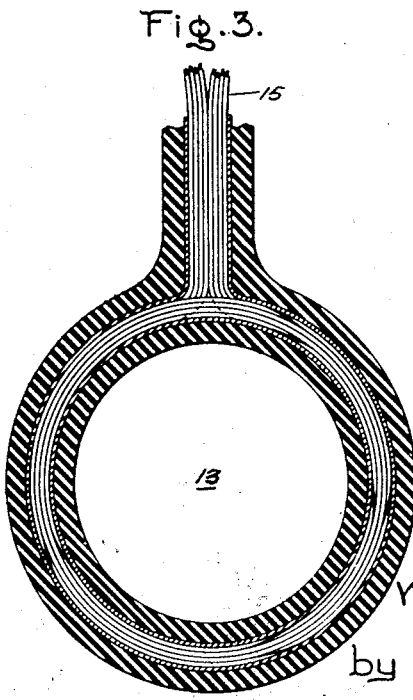

2 of a porcelain-clad instrument current transformer provided with an embodiment of the invention, Fig. 2 is an enlarged sectional view of the primary winding of the transformer shown in Fig. 1, Fig. 3 is another sectional view of the same winding taken on line 3—3 of Fig. 2, Fig. 4 is an exploded perspective view of one of the two coils of the winding shown in Figs. 2 and 3, Fig. 5 is a development of the conductor which forms the coil shown in Fig. 4 with the strand insulation omitted, Fig. 6 is a perspective view of the coil which is shown exploded in Fig. 4, Fig. 7 is a cross sectional view of the coil taken on line 7—7 of Fig. 6, Fig. 8 is a perspective view of a modification, Fig. 9 is an exploded view of the modification shown in Fig. 8, and Fig. 10 is a development of the conductor which forms the coil shown in Figs. 8 and 9.

Referring now to the drawing and more particularly to Fig. 1, the transformer is shown as comprising a base tank 1 on which is mounted an elongated porcelain insulator 2 at the top of which are shown a pair of high voltage terminals 3. Inside the tank and insulator is the transformer proper comprising a core 4, a low voltage coil 5 and a high voltage coil 6. The low voltage coil is provided with leads 7 ending in terminals 8 in a low voltage terminal box 9. The high voltage winding is provided with leads 10 which are encased in a metal sheath 11 which also encases the high voltage coil. Surrounding this sheath is solid insulation 12 of any suitable type.

The high voltage primary winding 6 is shown in enlarged transverse section in Fig. 2 and it will be seen that it is symmetrical on both sides of a vertical line through the middle. This is because it is made up of duplicate two-turn coils 13 and 14. It will be observed that the coils are located facing each other, so to speak, so that the leads of the two coils are at the center of the winding whereby there will be minimum spacing between the leads adjacent the winding. Each coil has two turns of a stranded conductor 15 which has two side-by-side located groups, each of four radially disposed strands. The coil 13 of Fig. 2 is shown in Fig. 3, which is a section taken on line 3—3 of Fig. 2 in which the four radially disposed strands of the two laterally disposed groups of conductors are clearly shown. It will also be seen from Fig. 3 that the coil has two full turns and that its start and finish come together, and from Figs. 2 and 3 taken together it will be noted that the start and finish are also in the same radial plane of the coil so that there is minimum axial, as well as circumferential, spacing between them.

The way the strands of the conductor are transposed so as to form the compact two-turn coil 13 is shown by the exploded perspective view in Fig. 4, the development of its conductor in Fig. 5 and the compacted perspective view in Fig. 6. In these three figures the start and finish ends of the coil or conductor, as the case may be, have been correspondingly labeled. Considering first, for example, a strand numbered 16 which is visible in all three of the last mentioned figures and tracing it from start to finish, it will be seen that after approximately one-eighth of a turn it is transposed laterally to the left by the width of the conductor 15, in which lateral position it remains until slightly more than one turn has been made, at which point it is again transposed laterally but this time to the right or in the opposite direction and it then continues straight on in this latter position to the finish where it has the same position relative to the other strands that it had at the start. It will also be noted that between the two lateral transpositions the strand 16 is also transposed radially from the top or outside to the bottom or inside and then after the second lateral transposition it is retransposed radially so that it finishes with the same radial position that it had at the start.

The position of the conductor 16 in Fig. 6 is indicated on Fig. 7 which is a section taken on line 7—7 of Fig. 6. All of the other strands have corresponding transpositions although they take place at different circumferential locations on the coil. Furthermore, it will be noted that at one turn from the start and finish, that is to say, at the middle of the length of the conductor forming the two-turn coil, all of the strands have been transposed laterally the width of the conductor so that in effect the entire conductor has been transposed laterally. It is this which makes it possible for the start and finish to be at the same place in the coil.

It is not essential that the conductor consist of laterally displaced groups of parallel strands or that it have two turns and in the modification shown in Figs. 8, 9 and 10 the conductor consists of but one group of four radially superposed stands. In this modification the conductor continues from the start for three-quarters of a turn, being four strands high and one strand wide. The inner two strands are then laterally transposed and radially reversed so that for the next half turn the conductor is two strands high and two strands wide. The outer two strands are then similarly transposed to the left and radially reversed and the conductor then continues for one turn of one strand wide and four strands high and the strands have all been transposed the width of one strand to the left. At this point the inner strands are retransposed to the right and reversed radially so that for the next half turn the conductor is two strands high and two strands wide and at one-quarter of a turn from the finish the outer strands are retransposed to the right and reversed radially so that all the strands finish in the same relative positions in which they start. Fig. 9 shows the developed conductor of Fig. 10, which has just been described, coiled in three turns but the turns are separated so as to show how the turns fit together. The compacted three-turn coil shown in Fig. 8 will be seen to have an average thickness of six strands and to be two strands wide and it will be observed that, as in the previous modification, the start and finish are as close as possible to each other, both circumferentially and axially. Obviously, also, two of the coils shown in Fig. 8 can be mounted face to face as are the coils 13 and 14 in Fig. 2 so as to provide a six-turn two-coil winding. An advantage of the two-coil four-lead winding is that selective series parallel connections of the coils can be made so as to adapt the winding for use with circuits having a wide range of current.

It will be observed from Figs. 6 and 8 that the coils are very compact and that the oblong cross section strands have not been twisted into non-parallel planes at any point in the coil and that the top and bottom surfaces of all the strands remain essentially parallel with each other at all cross sections of the coil so that there are substantially no waste spaces in the coil which are not filled with copper, except, of course, for the insulating wrapping around the strands which is shown in Fig. 4.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A multi-turn electrical coil for series connection in a line having a high voltage relative to ground, said coil having at least one conductor with at least two strands, said strands being radially superposed in the conductor at the start and finish of said coil, said strands being axially and radially transposed an even number of times, said transpositions being successively reversed and being so located circumferentially that the start and finish of said coil have substantially the same axial and radial position, linearly extending leads from said start and finish, and a tubular potential grading shield surrounding the start and finish of said coil and surrounding said leads.

2. A circular multi-turn coil as defined in claim 1 in which the conductor comprises two side-by-side groups each of at least two radially superposed strands.

3. In a current transformer for high voltage circuits, a pair of high voltage terminals, a circular whole numbered turn insulated primary winding having closely adjacent parallel leads extending respectively from said terminals to the start and finish of said winding, a conductive potential grading shield surrounding said leads, an electrical connection between said shield and one of said leads, said winding having at least one conductor consisting of at least two strands, said strands being transposed at different circumferential locations so that they are all axially offset in the same direction at one turn and even multiples thereof from the start and finish of said winding whereby said start and finish have minimum separation.

WILFRED J. BILODEAU.

REFERENCES CITED

The following references are of record in the file of this patent:

UNITED STATES PATENTS

| Number | Name | Date |
| --- | --- | --- |
| 2,249,509 | Welch | July 15, 1941 |
| 2,310,684 | Farry | Feb. 9, 1943 |

FOREIGN PATENTS

| Number | Country | Date |
| --- | --- | --- |
| 644,871 | France | June 19, 1928 |
| 687,152 | Germany | Jan. 24, 1940 |